United States Patent

Klein

[15] 3,647,033
[45] Mar. 7, 1972

[54] SECONDARY SHOE BRAKE LINING
[72] Inventor: Bruce W. Klein, South Bend, Ind.
[73] Assignee: The Bendix Corporation
[22] Filed: May 21, 1970
[21] Appl. No.: 39,411

[52] U.S. Cl. ..........................188/251 R, 188/325, 188/328
[51] Int. Cl. .........................................................F16d 51/24
[58] Field of Search ..............188/251 R, 251 M, 251 A, 325, 188/328, 331; 192/107 M

[56] References Cited

UNITED STATES PATENTS 3,007,549  11/1961  Klein .............................188/251 R X
1,156,689  10/1915  Jones ..................................188/251 R
2,987,145  6/1961   Sampson ........................188/251 R X

*Primary Examiner*—George E. A. Halvosa
*Attorney*—Raymond J. Eifler and Plante, Hartz, Smith and Thompson

[57] ABSTRACT

In a vehicle servo brake of the type having a rotatable brake drum and a primary and a secondary shoe operable to stop rotation of the drum the improvement wherein the secondary shoe has a lining wherein at least 50 percent of the total surface area of the lining is a semimetallic material and at least 15 percent is organic material.

3 Claims, 2 Drawing Figures

SECONDARY SHOE BRAKE LINING

BACKGROUND OF THE INVENTION

This invention relates to improved brakes for automobiles and more specifically to the brake lining on the secondary shoe of the brake.

The brakes on American cars today require friction materials (i.e., disc pads and linings) that have acceptable fade and recovery characteristics and that are at the same time silent, nonabrasive, and long-lived under normal driving conditions. The selection of friction material for any brake involves technical, economic, and aesthetic criteria. Specific criteria are the life of the material at high and low operating temperatures; the cost of the material; the effectiveness of the material when it is new, when it is old, when it is hot, when it is cold, at high speed, and low speed; noise; and fade, which is the loss of braking power at high temperatures. The magnitude of the material selection problem for brake linings on the primary and secondary shoe of a drum (servo) brake is perhaps best illustrated by outlining the various brake lining materials used and their properties.

Conventional organic materials: The foundation or major constituent of practically all organic friction materials is asbestos fiber, although other materials such as steel wool may be used. Asbestos is chosen because of its thermal stability, its relatively high-friction level, and its reinforcing properties. Since asbestos alone, does not offer all the desired friction properties, other materials called friction modifiers are added. Modifiers are varied in type and content to provide desired levels of effectiveness, wear, fade, recovery, and noise. The total organic content of this material varies from 50 to 60 percent by volume. The material is characterized by sharp losses in friction and/or wear rate above 400° F, long low-temperature life times, and relatively high compressibility, especially when hot. The specific gravity is in the range of 1.60 to 1.80.

High-temperature organic materials: High-temperature organics as a class are noisier and more agressive to rotors or drums than conventional organics: low-temperature wear is poorer and their high-temperature wear much better. Without abrasives they are low-friction materials and with abrasives they are high-friction materials. They have a much lower organic content than the conventional organic material and their specific gravities fall in a range of 2.2 to 2.8. They are most commonly used in solid-rotor brakes, heavy duty truck, and on competition cars. Similar materials with a much higher metallic content are used in aircraft brakes.

Sintered friction materials (metallic): Sintered friction materials, with either copper or iron powder matrices, eliminate the problem of high temperature wear and fade but are characterized by high cost, structural brittleness, cold ineffectiveness, and noise and/or opposing surface wear. In general, they require cup confinement or structural backing (two-layer construction).

Semimetallic materials: Semimetallics are used for heavy-duty drum brakes as well as disc brakes. They are capable of operating over the temperature range of 500° to 1,000° F, in effect bridging the gap between conventional organic materials and sintered metallics. The formulations of semimetallics, disclosed in U.S. Pat. No. 3,434,998 to F. W. Aldrich differ from those of the organics on two important counts: their total organic content is low and they contain no asbestos, metal fiber, e.g., steel being the reinforcing agent. Further, semimetallics have high-thermal conductivities, very low compressibilities, and they polish but do not wear or groove opposing surfaces. Generally, a semimetallic is similar to sintered material in that it has a high iron and graphite content. However, unlike sintered materials, the iron and graphite is mixed with an organic resin and "cured."

Returning now to the problem of selecting a friction material lining for a brake, reference is made to the following tabulations which reflects the problems associated with friction material linings on prior art brakes.

FRICTION MATERIAL LININGS ON PRIOR ART BRAKES

| Primary shoe | Secondary shoe | Problems |
| --- | --- | --- |
| Sintered | Sintered | 1. Cost<br>2. Ineffective when new<br>3. Ineffective when cold<br>4. Noise |
| Organic | Organic | 1. Poor life (wear)<br>2. Ineffective when (fade) |
| Organic | Sintered | 1. Poor life (wear) |
| Sintered and Organic | Sintered and Organic | 1. Poor life (wear) |
| Semimetallic | Semimetallic | 1. Ineffective when new<br>2. Ineffective when cold<br>3. Overly effective at speeds less than 10 m.p.h. (sensitivity)<br>4. Noise |

The tabulations show that there have been many attempts to minimize and/or eliminate problems. However, past improvements in one area were gained at a sacrifice and/or loss in another area. For instance, low-speed sensitivity and noise could only be solved at the expense of increased wear, increased cost and/or fade. The problem of low-speed sensitivity is related to the effectiveness of the brake, in that, at speeds less than 10 m.p.h. when the brake is applied it grabs or locks to abruptly stop rotation of the brake drum. With respect to vehicles, this problem can be characterized as loss of control.

SUMMARY OF THE INVENTION

To improve the controllability of a vehicle when the brakes are applied at speeds below 10 m.p.h., the secondary shoe of the brake is lined with an organic material and a semimetallic material. The invention is characterized by a brake having a primary shoe with an organic liner and a secondary shoe with a lining surface comprised of at least 15 percent by area of organic material and at least 50 percent by area of semimetallic material and disposed so that the semimetallic material is located between the organic material and the anchor end of the secondary shoe.

Accordingly, it is an object of this invention to eliminate low speed sensitivity of a brake.

It is another object of this invention to produce a brake that does not have any of the problems associated with prior art brakes.

It is also an object of this invention to eliminate brake noise when braking a vehicle at speeds below 10 m.p.h. while maintaining previously obtainable good performance at speeds above 10 m.p.h.

It is another object of this invention to improve the performance of a brake.

It is another object of this invention to improve the controllability of vehicles when braking at speeds below 10 m.p.h.

The above and other objects and features of the invention will become apparent from the following detailed description taken in conjunction with the accompanying drawings and claims which form a part of this specification.

DESCRIPTION OF THE PREFERRED EMBODIMENT

Figure 1:
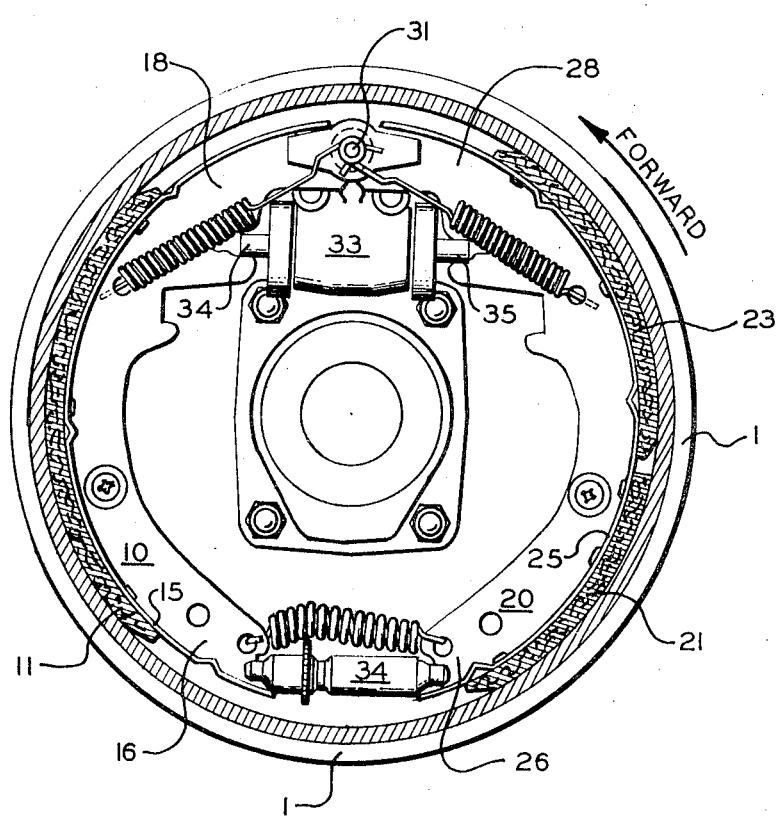
FIG. 1 is a detailed view of a servo-type brake utilizing the advantages of the invention.

Referring now to the drawings, FIG. 1 shows a servo brake of the type used on automobiles. For a more detailed description of servo brake construction and other brake arrangement to which the invention is applicable see U.S. Pat. No. 3,007,549 to B. W. Klein. The brake comprises a brake drum 1, a primary shoe 10 and a secondary shoe 20. The primary and secondary shoes 10, 20 are joined at one end, the toe end, 16, 26 by an adjustable strut 34. Anchor ends 18 and 28 of the primary and secondary shoe respectively communicate with anchor means 31 and with a wheel cylinder 33 which applies pressure to the shoe to drive them against the inner surface of the rotating drum. The direction of rotation of the drum 1 determines which shoe is the primary shoe and which shoe is the secondary shoe. The primary shoe is said to drive the secondary brake shoe which is the brake shoe which does the major brake operation. On the arcuate surface portion 15 of the primary brake shoe 10 there is a brake friction liner 11 of organic material. The liner 11 may be one piece or comprised of a plurality of segments. The friction material lining 21 and 23 on the arcuate surface portion 25 of the secondary shoe 20 is comprised of two different materials. Although only two segments are shown, 21, 23 the lining may be comprised of many segments or a single segment so long as the organic liner 21 covers at least 15 percent of the total surface area covered by both liners 21, 23 on the secondary shoe and the semimetallic liner 23 covers at least 50 percent of the total surface area covered by both liners 21, 23 on the secondary shoe. Further, it is preferred that the organic liner 21 cover between 15 to 45 percent of the total surface area covered by both liners 21, 23 on the secondary shoe 20.

Figure 2:
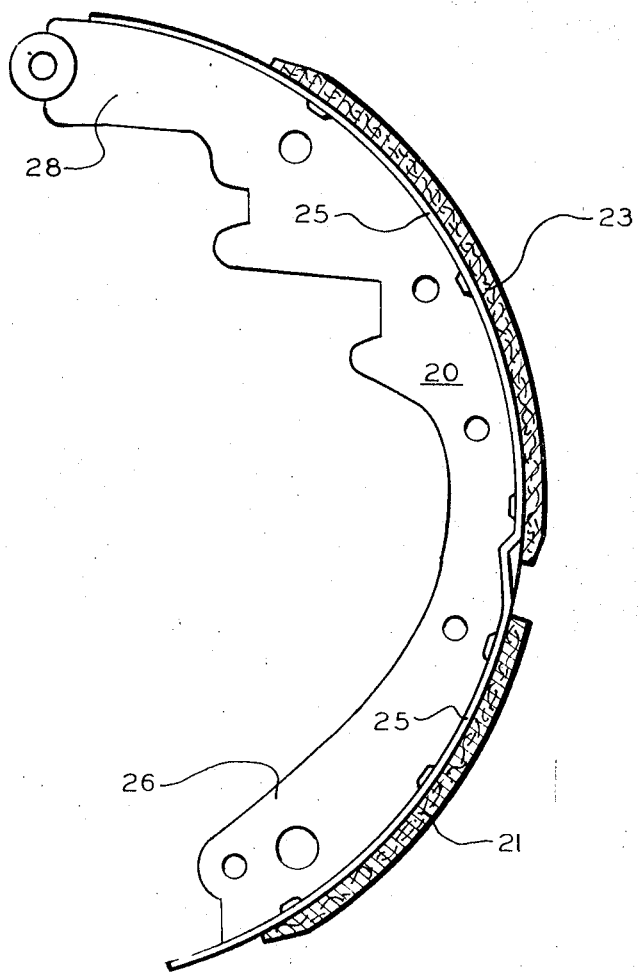
FIG. 2 is a side view of the secondary shoe which embodies the principles of the invention.

FIG. 2 shows a detailed view of a secondary shoe 20 having a toe end 26 and an anchor end 28 and an arcuate surface portion 25. Disposed in a first area on the arcuate surface portion 25 is a brake friction liner 21 comprised of organic material. Located in a second area between the organic liner 21 and the anchor end 28 is a brake friction material liner 23 comprised of a semimetallic material. In a vehicle servo brake of the type having a friction material liner on the secondary shoe, it is preferred that of the total surface area covered by friction materials on the secondary shoe, that an organic liner cover at least 15 percent of that total covered surface area and that a semimetallic liner cover at least 50 percent of that total covered surface area.

OPERATION

In operation, when hydraulic fluid under pressure is delivered from a master cylinder to the wheel cylinder 33 of the servo brake shown in FIG. 1, the plungers 34 and 35 move outwardly until the brake lining is brought into engagement with the brake drum 1. During the interval of time from moving the brake lining into engagement with a brake drum, no brake action is produced. In this movement of the brake linings into engagement with the brake shoe, both brake shoes 10 and 20 may pivot about the adjusting strut 34 and thereby move the adjacent cooperating ends 18 or 28 away from the anchor means 31, or one of the brake shoes may take this entire initial movement with the result that one of the cooperating ends 18 or 28 remain in engagement with the anchor means 31 and the other moves away from the anchor means 31. Regardless of the specific initial movement of the brake shoes 10 and 20, which movements do not enter into the brake action subsequently created, when the lining elements 11, 21 and 23 of the brake shoes engage the rotating drum 1, the brake shoes are rotated in the direction of the drum with the end 28 of the secondary brake shoe 20 being forced into engagement with the anchor means 31, the primary brake shoe 10 having the end 18 moving away from the anchor means 31.

As hydraulic pressure is increased within the wheel cylinder 33, the plungers 34 and 35 of the wheel cylinder both still tend to urge the brake shoes 10 and 20 for pivotal rotation about the adjusting strut 34. But with the brake shoes now in engagement with the brake drum, the brake shoes tend to rotate counterclockwise in the direction of the rotation of the drum so that the plunger 35 is, in effect, a stationary member and the resulting hydraulic force in the wheel cylinder is applied to the plunger 34 tending to move it outwardly to effect further pressure engagement of the primary brake shoe 10 with the brake drum 1.

From the foregoing it will be apparent that there are two forces acting on the brake shoes 10 and 20 one of which is the direct hydraulic force from the wheel cylinder 33 and the other of which is the rotative force or rotative torque applied to the primary brake shoe 10 by rotation of the drum 1, which, in turn, applies that rotative torque to the secondary brake shoe 20 to drive it into pressure engagement with the brake drum 1. It will be apparent that with the secondary brake shoe 20 being pivotally supported on the end of the adjusting strut 34, the rotative torque or drive torque of the primary shoe 10 through the adjusting strut 34 works on the secondary brake shoe 20 to rotate it about the anchor means 31 and thereby act as the lever to apply force to the secondary shoe to effect its pressure engagement with the drum. As a result, the pressure of engagement of the friction material 21 and 23 on the secondary shoe 20 is far greater than the engagement pressure of the friction material 11 on the primary shoe with the brake drum 1. In fact, the pressure of engagement of the friction material liner 11 on the anchor end 18 of the primary brake shoe 10 with the drum 1 is primarily the engagement pressure created by the hydraulic force in the wheel cylinder 33 acting through the plunger member 34, which pressure of engagement is considerably less than the pressure of engagement of the friction material liner 21 and 23 on the secondary brake shoe 20 with the brake drum 1. The friction material 11 on the toe end 16 of the primary brake shoe 10 has an engagement pressure with the brake drum 1 that results from the action of two forces, one of which is the hydraulic force in the wheel cylinder 33 acting through the plunger 34 tending to rotate the primary brake shoe 10 about the adjusting strut 34 as a pivot; the other force is the rotative torque effect on the primary shoe 10 resulting from engagement of the friction material liner 11 on the anchor end 18 of the primary shoe 10 with the brake drum 1. These two forces have an additive effect with a result that the pressure of engagement of the friction material liner 11 on the toe end 16 of the primary shoe 10 is greater than the pressure of engagement of the friction material liner 11 at the anchor end of the primary shoe 10 but is still considerably less than the pressure of engagement of the friction material liner on the anchor end and toe end of the secondary brake shoe 20.

The applicant has discovered that the particular combination of friction materials shown for the secondary shoe of the brake increases the life of the brake and the effectiveness of the brake; while decreasing sensitivity, the cost of the brake, noise, and fade. This approach was completely opposite of the prior art which focused its attention on the primary shoe and sintered metal liners on the primary and/or secondary shoe. As shown in FIG. 1, a brake having the benefits of organic friction materials is obtained by having a totally organic friction material liner on the primary shoe and a secondary shoe having an organic friction material liner and a semimetallic friction material liner. The secondary shoe shown in the drawing eliminated the noise problem and the sensitivity problem at braking speeds below 10 m.p.h., without incurring any penalties and, at the same time, reduced the cost of the secondary shoe.

While a preferred embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

Having described the invention, what is claimed is:

1. A vehicle servo brake comprising:
   a brake drum; and a pair of brake shoes movable to said drum to produce therewith a braking action, one of said shoes leading the other in the direction of rotation of the drum from an anchor point and providing a primary shoe, the other of said shoes forming a secondary shoe, said shoes having a brake friction liner thereon engageable with said drum, the brake friction liner of said primary shoe consisting essentially of organic friction materials, and the brake friction liner of said secondary shoe consisting of two different friction materials, one of which is comprised of organic friction material and the other of which is comprised of semimetallic friction material disposed between the anchor end and said organic friction material and wherein the organic liner on the secondary shoe covers at least 15 percent of the surface area covered by both liners on the secondary shoe and said semimetallic liner covers at least 50 percent of the total surface area covered by both liners on the secondary shoe.

2. In the combination of a brake of the type having a rotatable brake drum, a primary shoe having an organic friction material liner, and secondary shoe operable with said primary shoe to stop rotation of said drum the improvement wherein the secondary shoe comprises:

a body having an anchor end and a toe end and an arcuate surface portion;

a liner comprised of organic material secured to the arcuate surface portion of said body; and a semimetallic liner secured to the arcuate surface portion of said body between said organic liner and said anchor end, said semimetallic liner covering at least 50 percent, and said organic liner covering at least 15 percent of the total surface area covered by both liners on said secondary shoe.

3. The combination as recited in claim 2 wherein said organic liner on said secondary shoe covers at least 15 percent but not more than 45 percent of the total surface area covered by both liners on said secondary shoe.

* * * * *